Nov. 28, 1961 — H. W. McKENNA — 3,011,122
BINARY TIMER CONTROL
Filed Feb. 6, 1958 — 2 Sheets-Sheet 1

INVENTOR.
Howard W. McKenna
BY
ATTORNEY.

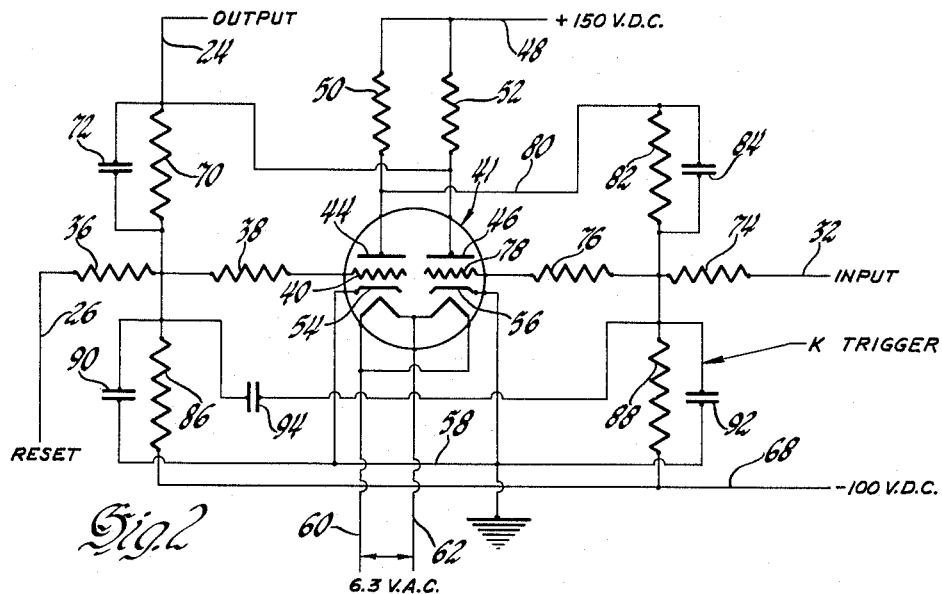
Fig. 2
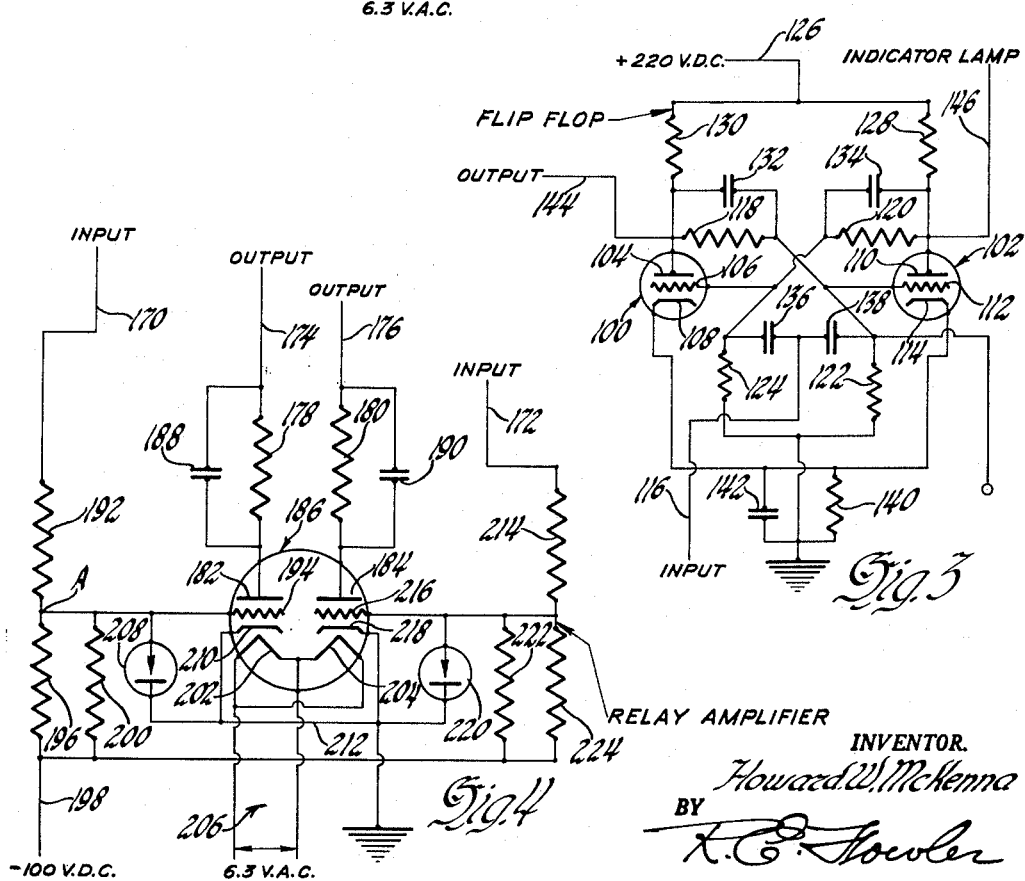
Fig. 3
Fig. 4
INVENTOR.
Howard W. McKenna
BY
R. E. Fowler
ATTORNEY.

United States Patent Office 3,011,122
Patented Nov. 28, 1961

3,011,122
BINARY TIMER CONTROL
Howard W. McKenna, Royal Oak, Mich., assignor to General Motors Corporation, Detroit, Mich., a corporation of Delaware
Filed Feb. 6, 1958, Ser. No. 713,673
5 Claims. (Cl. 324—68)

This invention relates to timing control means and more particularly to timing control means which may readily be associated with computing or data processing equipment to accurately record the time period during which the machine is in use.

Many of the current electronic calculating, computing, or data processing machines operate at such high rates of speed that ordinary hand operated methods of recording time for any one phase of operations are inadequate. Since charges for machine use are based on time of operation, determining such time accurately becomes important. It would also be advantageous to incorporate time indications directly on the output record of the machine, so that the subscriber would know exactly the basis for billing.

It is therefore an object in making this invention to provide counting means producing timed pulses that may be fed into a computing machine to indicate intervals of operation.

It is a further object in making this invention to provide an electronic counter of the binary type to produce control pulses indicative of time intervals which may be injected into a computing machine and produce a time record as part of the record produced by the machine.

It is yet a further object in making this invention to provide an electronic binary counter for connection to a computing machine for producing timed records as part of the record produced by the machine.

With the above and other objects in view which will become evident as the specification proceeds, the embodiments of this invention will be best understood by reference to the following specification and claims and the illustrations of the accompanying drawings, in which:

FIGURE 2 is a detail circuit diagram of the K trigger portion of the system shown in FIGURE 1.

FIGURE 3 is a detail circuit diagram of one of the "flip-flop" circuits used for the binary counter, and FIGURE 4 is a detail circuit diagram of one of the relay amplifiers.

Figure 1:
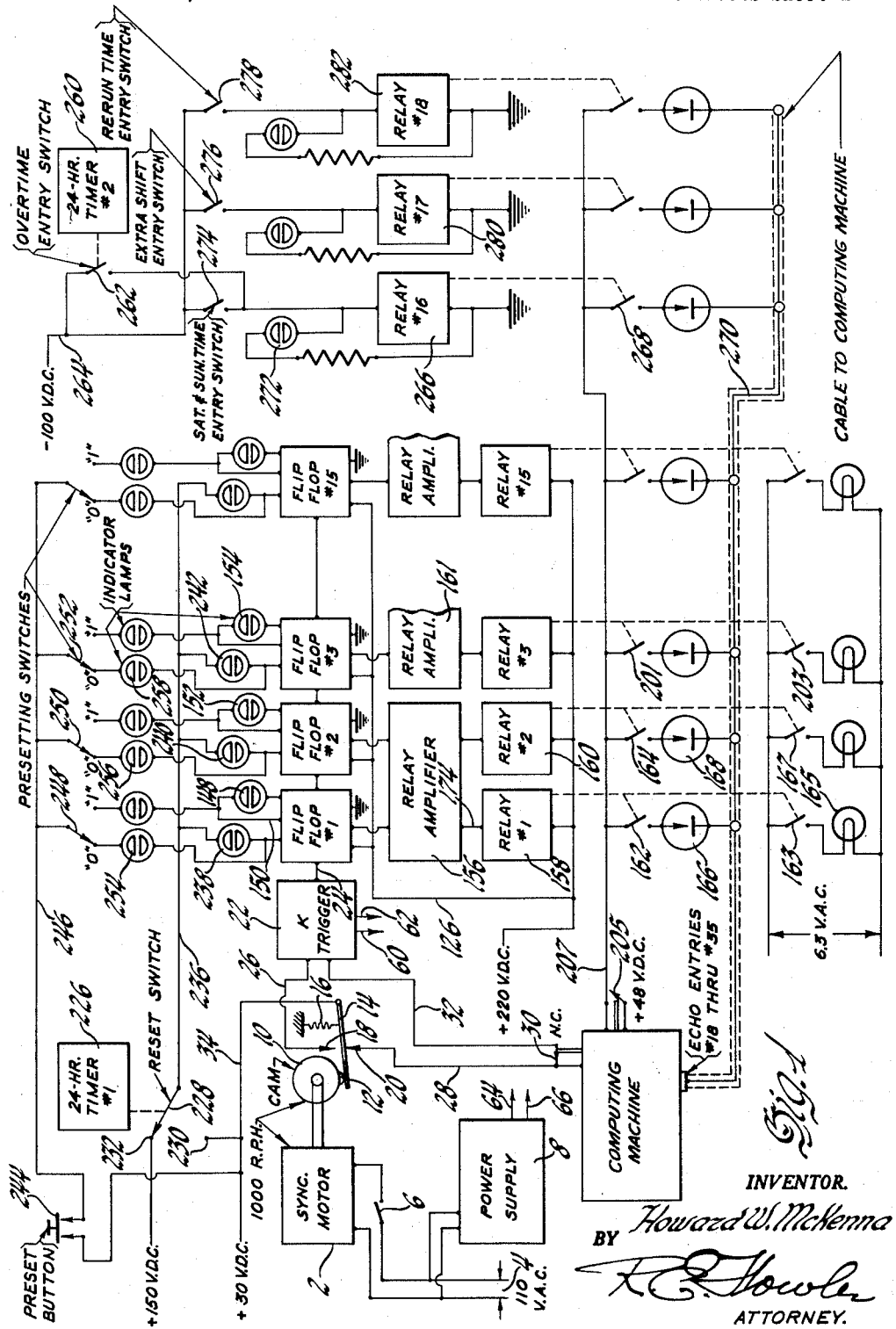
FIGURE 1 is a block and schematic drawing of a system embodying my invention.

In order to measure time periods, a unit of measure must first be determined. Conventionally our hours are broken down into minutes and seconds. However, in determining time intervals upon which charges are to be based for time of use of a machine, it may be more desirable to use as a unit, a base of 10. As an illustration only, for my system will operate on any given unit base, I have selected time intervals of 1/1000 of an hour. In order to produce control pulses of this frequency, a synchronous motor 2 is directly connected to the power supply lines 4 and controlled by a manual switch 6. A power supply unit 8 for the electronic components of the system is also connected to the main power supply lines 4. The synchronous motor 2 is adapted in this case to rotate at 1000 r.p.h. though any other speed may be used.

The motor 2 drives a cam 10 which has a single lobe 12. A switch armature 14 spring biased toward the cam by spring 16 has its pivotal end in engagement with the cam surface and is moved between spaced stationary contacts 18 and 20 by said cam. Thus 1000 pulses per hour are fed to the K trigger circuit 22.

The trigger circuit 22 is provided to produce one control pulse on line 24 for each operation of the cam switch 14—18—20. In the present design this is a negative pulse. Thus, 1000 negative pulses are applied to line 24 each hour by this construction. FIG. 2 shows in detail the circuit of the K trigger section. Stationary contact 18 is connected to the K trigger circuit by line 26 and stationary contact 20 is connected through line 28 and normally closed interlock switch 30 with line 32 also connected to the K trigger circuit 22. Said switch 30 is actuated by certain operations of a computing machine such, for example, as an IBM model 704 which includes a printer. A power supply line 34 connected to a source of 30 volt direct current power is directly connected to armature 14 and supplies that voltage to either line 26 or line 32 depending upon the position of armature 14, to reset or trigger the circuit.

Referring now to FIG. 2, line 26 is shown connected through resistances 36 and 38 in series to the control grid 40 of the first triode section of tube 41. Plates 44 and 46 of the tube are commonly supplied with power from line 48 which is connected to a supply of 150 volt direct current. Load resistors 50 and 52 are serially connected with plates 44 and 46 respectively. Cathodes 54 and 56 are commonly connected to line 58 which is grounded. The filaments of tube 41 are supplied with low voltage power through leads 60 and 62 which although not shown connected, extend to lines 64—66 on the power supply 8. Line 68 is connected to a source of constant negative D.C. voltage, in this instance —100 volts from the power supply 8. A symmetrical trigger circuit is provided. Plate 46 of the second section is directly connected to output line 24 and through resistance 70 to a point intermediate resistances 36 and 38 and then to control grid 40. Resistance 70 is shunted by condenser 72. In a similar manner input line 32 is connected through series resistances 74 and 76 to grid 78 of the second triode section. Plate 44 of the first section is connected through line 80 and resistance 82 to a point intermediate resistances 74 and 76. A condenser 84 is connected in shunt to resistance 82. To complete the trigger network, the power line 68 is connected through resistance 86 to the common terminus of resistances 36 and 38 and also through resistance 88 to the common terminus of resistances 74 and 76. Condenser 90 is connected from one end of resistance 86 to ground and condenser 92 from one end of resistance 88 to ground. Condenser 94 is connected between the common terminus of resistances 36 and 38 and that of resistances 74 and 76.

As before mentioned, the function of this trigger circuit is to apply one negative pulse to output line 24 for each actuation of switch 14—18—20. With the armature 14 riding on the low part of the cam, +30 volt D.C. is applied to line 26 to overcome the negative bias imposed by the —100 volt D.C. on line 68 and remove the bias applied to the first triode section so that conduction through this section is high and the voltage on the plate 44, low. Since this is connected to grid 78 of the second section, the voltage thereof is low and conduction through this section is cut off and the voltage at plate 46 is relatively high. Thus a positive signal is applied to output line 24. When the lobe 12 causes the armature to move, the 30 volt D.C. is removed from line 26 and applied to line 32. This forces the second section to conduct and cuts off the first section. This raises the bias voltage on grid 78 of the other section and together with the application of the +30 volt D.C., causes the second section to conduct, reducing the plate voltage at 46 and applying a negative pulse to output line 24 which will be counted by the binary counter. The K trigger circuit is stable and will not revert to its initial condition until the switch is allowed to assume its opposite position and apply 30 volts to line 26.

The equipment so far described therefore produces a train of pulses equally spaced in time for producing timing marks on the computer record. In order to count the pulses from a certain time zero, a binary timing system is utilized. This consists of a cascaded series of trigger circuits which maintain either one of two fixed positions, which combination of positions indicates the total number of impulses received during a certain predetermined time interval. These trigger circuits are all alike and are stable multivibrator circuits identified as "flip-flop" No. 1, No. 2, No. 3, etc. Any number of these circuits may be utilized in cascade depending on the size of the numbers which are to be counted. The specific detail of each flip-flop circuit is illustrated in FIGURE 3 and as before indicated, each flip-flop circuit remains in its last actuated position until the next succeeding negative pulse changes the condition of conductance from one of its tubes to the other. Various types of trigger circuits may be used and it is desired to state that the current trigger or flip-flop circuit is only one type exemplary of many.

Referring specifically to the flip-flop circuit shown in FIGURE 3, each circuit consists of a pair of triode tubes 100 and 102 which may be either individual triode tubes or two triode sections encased in a single tube envelope. The first triode tube 100 includes a plate 104, a control grid 106, and a cathode 108, and the second section in like manner includes a plate 110, a control grid 112, and cathode 114. The input circuit to the flip-flop is applied to line 116 which, if it is used as flip-flop No. 1, is the same as line 24. This applies the various time signals to the trigger stage. The plates and grids of the sections are cross-connected, since plate 104 is connected through resistance 118 to control grid 112 and plate 110 in similar balanced manner, through resistance 120 to control grid 106. Control grid 112 is connected through biasing resistor 122 to ground and control grid 106, through a similar biasing resistor 124 of equivalent value, is also connected to ground. Power supply to the plates of these tubes is obtained through 220 volt D.C. line 126 which is connected through load resistors 128 and 130 to plates 110 and 104 respectively. Condensers 132 and 134 are connected in shunt across resistances 118 and 120. Input line 116 is connected through coupling condensers 136 and 138 respectively to grids 106 and 112. The cathodes 108 and 114 are commonly connected to ground through biasing resistor 140 shunted by condenser 142. The output of one of these trigger or flip-flop stages is obtained from a connecting line 144 and a connection also extends from plate 110 of the other half of the trigger tube through line 146 to an indicating lamp which counts and indicates the condition of the stage.

With the connections made as indicated in each trigger circuit, the application of a negative input pulse which occurs on line 24 once during each revolution of the cam will cause the conduction of the triodes to reverse. The first triode such as illustrated at 100 may be called the "0" triode and the second triode, the "1" triode. If the output is taken off the plate of the 0 triode as indicated in FIGURE 3, there will be a negative pulse applied to each output line such as line 144 each time the trigger circuit under consideration enters the so-called "0" state, which is on every other pulse which this stage receives. Under the conditions existing when the arm 14 rides on the main cam surface, the one triode such as 102 in flip-flop No. 1 is conducting and the triode 100 or "0" triode is non-conducting. When lobe 12 forces armature 14 to assume its alternate position, a negative pulse is applied to line 24 (line 116) driving grid 112 negative and cutting off the first triode 102. The pulse simultaneously applies a negative voltage to grid 106 but since it is cut off, it does not affect this tube. However, the reduction in flow through tube 102 causes its plate voltage to raise, changing the voltage on grid 106 and letting the first tube 100 conduct. This reduces the voltage on the output line 144 to produce a negative pulse on that line. The trigger circuit remains in this condition until the next negative voltage pulse is again re-applied by the passing of the lobe when the trigger circuit again flops. Thus, at each negative pulse application, the trigger circuit changes conduction from one of the triode tubes to the other and the next application of a negative pulse reverses the action. Since each flip-flop circuit contains an output line upon which a negative pulse is developed each complete cycle, each succeeding flip-flop circuit will be reversed by the preceding one, each second pulse application to the first.

For each flip-flop stage there is provided an indicating neon light 148 which is connected to the line 146 from the plate 110 of the second triode stage. This lamp is also connected through line 150 to the 220 v. supply line 126 inside the trigger circuit, thus when tube 102 becomes non-conductive indicating lamp 148 lights to indicate the condition of this particular unit. Upon the lighting of any one of the neon counting indicators 148, 152, 154, etc. of any one of the flip-flop circuits 1 through 15, it is also desired to actuate a control relay and transmit a pulse indicating the energization of such indicating light to the computer. Therefore the output of the flip-flop stage No. 1 is connected through an associated relay amplifier 156 which contains two sections, one amplifying the output from flip-flop stage No. 1 and the other half amplifying the output of flip-flop stage No. 2. The amplified signal passing through the relay amplifier is then applied to a control relay 158 or 160 actuating associated switches 162 or 164 to complete a circuit through series rectifiers 166 or 168 and impress suitable digitary indications on the computer or printer.

The circuit of one relay amplifier stage such as 156 is shown in FIGURE 4 and as stated above, this amplifier serves two trigger circuits. Therefore, the output of flip-flop stage No. 1 would be connected through line 170 to one amplifier stage and control the same, whereas the output from the second flip-flop No. 2 would be connected to input line 172. The amplifier is relatively conventional and the plates are supplied with voltage through lines 174 and 176 connected through load resistors 178 and 180 to the first and second plates 182 and 184 respectively of double triode tube 186. A shunt capacitor 188 is connected around resistance 178 and in like manner a second capacitor 190 is connected in shunt with resistor 180. Biasing resistor 192 is connected between the input line 170 and control grid 194 of the first section and a second resistor 196 is connected between the control grid 194 and the source of 100 v. D.C. negative voltage connected to line 198. A resistance 200 is connected in shunt across resistance 196. The filaments 202 and 204 of the tube are commonly supplied with 6 v. power through supply lines 206 originating with the power supply 8. A rectifier 208 is connected between grid 194 and cathode 210 of the first section, which cathode is connected directly to ground through line 212. The second amplifier section is a duplicate of the first and includes resistance 214 connected betwen input line 172 and the control grid 216 in the second section. Cathode 218 of this section is connected through a rectifier 220 to the grid 216 and two resistances 222 and 224 in parallel are connected between the grid 216 and the 100 v. source of negative D.C. voltage 198. When the input from the odd number flip-flop such as 1, 3 or 5 is applied to line 170, and this section conducts, the relay No. 1 is actuated to close its switch 162 and an indicating pulse is applied to the printer or computer as the instrument is being used so that a time mark appears on the record produced by the instrument and time of use can be directly read along with other intelligence on the tape. Since all of the various units are duplicates, it is not felt necessary to describe any further detail of any later sections. Neon tubes 148, 152, 154 are those indicating tubes appearing on the front panel of the machine and whose energization or deenergization in sequence indicate the total number of pulses counted.

To describe the counting function of the various binary circuits, as cam 10 rotates the K trigger circuit 22 shown in detail in FIGURE 2 applies a positive voltage from plate 46 to line 24 for the major portion of a cycle since the first triode section of the tube 41 conducts and the second section of this tube is non-conductive when the positive 30 volts from line 32 is applied to grid 40. When the lobe 12 moves the armature 14 breaking contact with stationary contact 18 and making contact with stationary contact 20, the +30 volts from line 34 is removed from grid 40 and applied to grid 78. This raises the voltage of grid 78 of the second triode section so that that section becomes conductive to simultaneously cause the first section of the tube to become non-conductive. The voltage on plate 46 will therefore be reduced and a pulse produced in the voltage on line 24 toward the negative although the voltage always remains above zero. This negative going pulse is the one which produces the counting in the binary system. The main purpose of the K trigger circuit is to remove any difficulty arising from chattering of the switch contacts. Once armature 14 mechanically engages contact 20 and the K trigger circuit reverses conductivity of the two triode sections to produce the negative going controlled pulse in line 24, the system will remain in this condition even though armature 14 momentarily breaks with stationary contact 20 or chatters with respect thereto. The conductivity will not revert to its original order until armature 14 engages contact 18 which positively applies the pulse +30 voltage D.C. to the control grid 40 causing the first section of the tube to become conductive. This produces a plurality of spaced negative going pulses on line 24 at the rate of 1000 per hour.

Assuming the system is set at zero indication, in this instance each zero stage in each flip-flop circuit is conducting. Referring to FIGURE 3, illustrative of each flip-flop circuit, tube 100 in this case would be conductive and tube 102 non-conductive. The negative going pulse from line 24 would be applied to input line 116. Since this line is capacitatively coupled through condensers 136 and 138 to control grids 106 and 112, it simultaneously drives each one of these tubes to cutoff. Since only one tube has been conducting, that is the tube affected. For the first pulse, therefore, flip-flop No. 1 receiving this negative going pulse would have applied to grid 106 a negative pulse to tend to cut off conduction through tube 100. The voltage on its plate 104 would increase and since that is coupled directly to grid 112 in tube 102, the conduction through that tube increases. The plate voltage at 110 therefore is reduced and since that plate is coupled also to grid 106, tends to emphasize the negative going grid 106 assisting the cutting off of conductivity through tube 100 until tube 100 is cut off and tube 102 in full conductance depending upon the bias. This reduces the voltage on plate 110 but since the voltage at that point is connected through the indicating tube 148 to supply line 126, there is a greater voltage difference across the lamp 148 than existed when tube 102 was non-conductive and therefore the lamp 148 glows.

At the same time the voltage on plate 104 has been increased so that the voltage on output line 144 is more and this line is directly connected to the input line 170 of the amplifier circuit shown in FIGURE 4. With normal voltage appearing on plate 104 under conditions where this tube is conductive, the voltage at the plate 104 substantially balances the −100 v. D.C. voltage applied from line 198 across the split voltage divided including resistance 192 and resistances 196 and 200 in parallel. At that time the voltage appearing at point A is relatively high negative, however, when the voltage at plate 104 is increased due to the tube 100 becoming non-conductive the balance set up in the voltage divider mentioned changes and the voltage on control grid 194 approaches zero to cause conduction through the amplifier or first triode section of the tube 186. Conduction through this tube and through the output line 174 flows directly through relay No. 1 (158) and it operates to switch contacts 162 and 163. The closure of switch 163 lights an indicating test lamp 165 on the rear of the panel. This is for checking purposes only. Closure of switch 162 completes a circuit into some of the internal connections of the printing machine and sets that up for recording a counting total when desired. The reason for connecting a rectifier 166 between switch 162 and the circuits of the printer is to prevent a direct interconnection of certain circuits within the printer so that they will not be shorted. The circuits remain in the described condition with lamp 148, and lamp 165, illuminated and relay switch 162 closed until the advent of a second negative going pulse on line 24.

When the second negative going pulse appears it again applies a negative pulse to both grids 106 and 112 of the first flip-flop circuit, but as in the previous instance it has no effect on the tube that is already cut off, which is now tube 100. This negative going pulse therefore drives grid 112 down and tends to reduce the conductivity in this tube which increases the voltage on plate 110 and simultaneously, in a similar manner previously described, increases the conductivity through tube 100. As the voltage across tube 102 increases, the difference between the line voltage and the plate voltage decreases, decreasing the voltage applied to the indicating lamp 148 and it is extinguished. Simultaneously the flow of current through amplifier 210—194—182 decreases and relay No. 1 drops out. The first stage therefore reverts to its initial condition in which the indicating lamp 148 goes out at the end of two pulses.

Simultaneously with the return in conduction in the "0" tube 100, a negative going pulse is applied to output line 144 which is connected to flip-flop No. 2. That stage is a duplicate of the flip-flop circuit shown in FIGURE 3 and the negative going pulse on the output of flip-flop No. 1 is applied to the input of flip-flop No. 2. This negative going pulse therefore changes the conductivity of the two tubes in flip-flop No. 2 to cause energization of indicating lamp 152 and relay No. 2 which closes its switches 164 and 167 to connect relay No. 2 into certain circuits in the printer. Therefore at the conclusion of two negative pulses applied to line 24, indicating lamp 148 is out and this circuit has returned to its original condition and indicating lamp 152 is now energized and relay No. 2 also energized to close the associated switches. Each flip-flop circuit reverses its conditions of conductivity and block out each time it receives a negative going pulse.

Upon the application of the third negative going pulse to line 24 by the output of the K trigger 22, flip-flop circuit No. 1 again reverses to energize lamp 148 and relay No. 1, but since this action does not apply a negative pulse to the output line 144, no signal is now transmitted to flip-flop circuit No. 2 and light 152 remains energized. Therefore, for a count of three lamp 148 and lamp 152 are energized as well as relays Nos. 1 and 2. Upon the application of the fourth negative pulse to line 24 which causes a reversal in conductivity of flip-flop No. 1, this extinguishes light 148 and transmits a negative signal to flip-flop No. 2, which in turn extinguishes lamp 152 and applies a further negative signal to flip-flop No. 3 which causes lamp 154 to be illuminated. This is the only lamp illuminated on the board and indicates a total count of 4. Simultaneously of course relay amplifier 161 conducts to energize relay No. 3 which closes its switches 201 and 203. These are the only switches closed at this time. Following the same trend, each pulse therefore causes a reversal of the flip-flop binary counters to illuminate different series of indicating lamps 148, 152, 154, etc., and the energization of certain groups of lamps together with their associated relays indicates the total count from the initial point together with the closure of certain circuits into the computing machine. The completion of the circuits into the computing machine, however, does not cause any signal or recording of the count. However, at a programmed time determined by the computing machine switch 205 is actuated. This applies a +48 v. D.C. to conductive line 207 which applies signals to the lines completed to the computing machine. The computing machine reads the information present on the lines and determines therefrom the time record. The reading, of course, is controlled by the various switches 162, 164, 201, etc. that are closed.

There are a number of other neon tubes which are mounted on the back of the panel and which are used for re-set or pre-set purposes. With the number of flip-flop or trigger circuits herein provided with a 1000 r.p.h. motor, the current device is capable of counting up to 32,767. This is equivalent to 32.767 hours. Since there are twenty-four hours in a day it is best to maintain one day's count separate from another. A 24-hour timer 226 is therefore provided so that under any continued operation, the device will automatically re-set itself once every twenty-four hours if necessary. This 24-hour timer will at the end of that period close a re-set switch by moving switch arm 228 from stationary contact 232 to engage contact 230 connected to a source of 30 volt D.C. through line 34. This is a very fast acting switch arm and only closes with contact 230 momentarily. This drops the voltage on line 236 from 150 volt D.C. to 30. When the timer 226 is actuated, a gas tube such as 238, 240 or 242 for each of the flip-flop circuits is connected to its associated flip-flop circuit and the relay is energized momentarily to set to zero. The re-set line 236 is connected to the 0 plates of all the flip-flop trigger stages through the neon tubes. When the counter is operating normally the re-set line 236 is connected to the 150 volt line as shown and the neons 238, 240 and 242 do not have sufficient voltage thereacross to fire because the plate voltage of the triode with which each is associated, varies from 100 to 200 volts. However, when the voltage on line 236 drops to 30 volts, the voltage across each neon is then sufficient to fire them and make all the 0 or left-hand triodes conduct which automatically re-sets the count register to 0. The closure of switch arm 228 on contact 230 is only for a short period of time and it then moves back to its original contact 232 and the device may then continue to count as previously.

If it is desired to at any time pre-set the system manually, there is a pre-set switch 244 provided which connects the 30 volt D.C. line to a second pre-setting set of switches through line 246. This line is connected through a plurality of so-called pre-setting switches 248, 250 and 252 which can be adjusted to pre-set either the "0" or "1" stage of each trigger circuit as desired. It operates in the same manner to apply 30 volts to further discharging neons 254, 256 or 258 operating in the same manner as previously described with relation to neons 238, 240 and 242.

There are also other factors that it may be advantageous to record on the final report, such as overtime, extra shift, Saturday and Sunday work and so forth. These can be added to the record of the particular work being done. At the right of FIGURE 1 of the drawings there is shown control means for setting the apparatus to introduce these additional factors into the record. A further 24-hour timer 260 is provided which actuates switch 262. Closure of the switch 262 applies the control voltage on line 264 to relay 266 to energize the same and close switch 268 to apply the proper indicating signal to the computing machine through echo cable 270. The closure of this switch would indicate overtime work. Neon bulb 272 connected in parallel with the relay 266 is energized at this time to indicate that the circuit is active. The operation of the overtime switch 262 will be automatic and may be adjusted to close daily at 5 p.m. It would automatically show any further use upon this time as being overtime.

There are also provided three manually operable switches 274, 276 and 278, for connecting power supply line 264 to the various relays 266, 280 or 282 respectively. Each of these switches would indicate a different factor of work. For example, the closure of switch 274 might indicate Saturday and Sunday time; the closure of switch 276, extra shift time and the closure of switch 278, re-run time, all of which might carry a different charge. Each of these switches would have its own indicating light to indicate that that circuit was active. Each may also be adjusted by the closure of the manual switch associated therewith to provide the proper indication on the record.

I claim:

1. In an indicating system for applying indicia to a computing machine, a source of electrical power, timed pulse generating means connected to the source of electrical power, a plurality of stable multivibrator circuits connected in cascade to the timed pulse generating means, each multivibrator having two sections that are alternately conducting, a control relay coil in series circuit with one section of each multivibrator and energized when that section conducts and switching means actuated by each relay coil connected in separate circuits to the computing machine and providing intelligence in the number of switches open and closed at any instant that the computing machine completes a phase of its operation and reads the resultant number of such switches that are closed as an indication of the conclusion of a time period and further switching means connected to the sources of electrical power and commonly to the first-named switching means actuated by the computing machine to apply signal voltage to the separate circuits upon command from the computing machine for such reading.

2. In a computing machine producing a record bearing results of computation, an automatic means for applying to said record indicia indicating the period of use of the computer comprising, a time pulse generating means for producing a series of equally spaced pulses, a plurality of flip-flop circuits connected in cascade to the output of the time pulse generating means to form a binary timing means, each flip-flop circuit controlling the next in order, each flip-flop circuit including two sections which are alternately conductive, a relay coil connected in series with one section of each of the flip-flop circuits and energized by conduction of that section, a switch actuated by each coil and connected independently to the computing machine, a source of electrical power, a main control switch connected to the source of electrical power and commonly to each of the switches actuated by the relay coils, said main control switch being actuated by the computing machine at the start and completion of a run to, as a combination, apply signals to the computing machine controlled by the positions of the various switches actuated by the relay coils which signals are representative of the extent of a time period of use.

3. In a computing machine producing a record bearing results of computation, an automatic means for applying to said record indicia indicating the period of use of the computer comprising, a time pulse generating means for producing a series of equally spaced pulses, a plurality of flip-flop circuits connected in cascade to the output of the time pulse generating means to form a binary timing means, each flip-flop circuit controlling the next in order, each flip-flop circuit including two sections which are alternately conductive, a relay coil connected in series with one section of each of the flip-flop circuits and energized by conduction of that section, a switch actuated by each coil and connected independently to the computing machine, a source of electrical power, a main control switch connected to the source of electrical power and commonly to each of the switches actuated by the relay coils, said main control switch being actuated by the computing machine at the start and completion of a run to, as a combination, apply signals to the computing machine controlled by the positions of the various switches actuated by the relay coils which signals are representative of the extent of a time period of use, and a master timer connected to the source of electrical power and all of the flip-flop circuits to switch to reset the system to zero at the end of fixed time intervals regardless of other factors.

4. In a computing machine producing a record bearing results of computation, an automatic means for applying to said record indicia indicating the period of use of the computer comprising, a time pulse generating means for producing a series of equally spaced pulses, a plurality of flip-flop circuits connected in cascade to the output of the time pulse generating means to form a binary timing means, each flip-flop circuit controlling the next in order, each flip-flop circuit including two sections which are alternately conductive, a relay coil connected in series with one section of each of the flip-flop circuits and energized by conduction of that section, a switch actuated by each coil and connected independently to the computing machine, a source of electrical power, a main control switch connected to the source of electrical power and commonly to each of the switches actuated by the relay coils, said main control switch being actuated by the computing machine at the start and completion of a run to, as a combination, apply signals to the computing machine controlled by the positions of the various switches actuated by the relay coils which signals are representative of the extent of a time period of use, a master timer connected to the source of electrical power and all of the flip-flop circuits to switch to reset the system to zero at the end of fixed time intervals, a plurality of manual switching means connected to the source of electrical power, additional relay coil means connected to each manual switching means and controlled thereby and additional individual switching means actuated by the additional relay coil means and connected to the computing machine and to the main control switch to apply additional signals to the computing machine when the main switch is actuated for further indicia on the record as desired.

5. In a computing machine producing a record bearing results of computation, an automatic means for applying to said record indicia indicating the period of use of the computer comprising, a time pulse generating means for producing a series of equally spaced pulses, a plurality of flip-flop circuits connected in cascade to the output of the time pulse generating means to form a binary timing means, each flip-flop circuit controlling the next in order, each flip-flop circuit including two sections which are alternately conductive, a relay coil connected in series with one section of each of the flip-flop circuits and energized by conduction of that section a switch actuated by each coil and connected independently to the computing machine, a source of electrical power, a main control switch connected to the source of electrical power and commonly to each of the switches actuated by the relay coils, said main control switch being actuated by the computing machine at the start and completion of a run to, as a combination, apply signals to the computing machine controlled by the positions of the various switches actuated by the relay coils which signals are representative of the extent of a time period of use, a master timer connected to the source of electrical power and all of the flip-flop circuits to switch to reset the system to zero at the end of fixed time intervals, a plurality of manual switching means connected to the source of electrical power, additional relay coil means connected to each manual switching means and controlled thereby, additional individual switching means actuated by the additional relay coil means and connected to the computing machine and to the main control switch to apply additional signals to the computing machine when the main control switch is actuated for further indicia on the record as desired and a second time switching means connected to at least a part of the additional relay coil means to energize the same at certain desired times to indicate extra time periods.

References Cited in the file of this patent

UNITED STATES PATENTS

| | | |
|---|---|---|
| 2,207,715 | Bumstead | July 16, 1950 |
| 2,659,533 | Quinby et al. | Nov. 17, 1953 |
| 2,665,845 | Trent | Jan. 12, 1954 |
| 2,724,553 | Faulkner | Nov. 22, 1955 |
| 2,772,048 | Collison et al. | Nov. 27, 1956 |
| 2,828,468 | Ball et al. | Mar. 25, 1958 |
| 2,841,334 | Abate | July 1, 1958 |
| 2,849,704 | Neff | Aug. 26, 1958 |